J. E. BUCK.
KNIFE.
APPLICATION FILED JUNE 16, 1911.
1,040,138.
Patented Oct. 1, 1912.
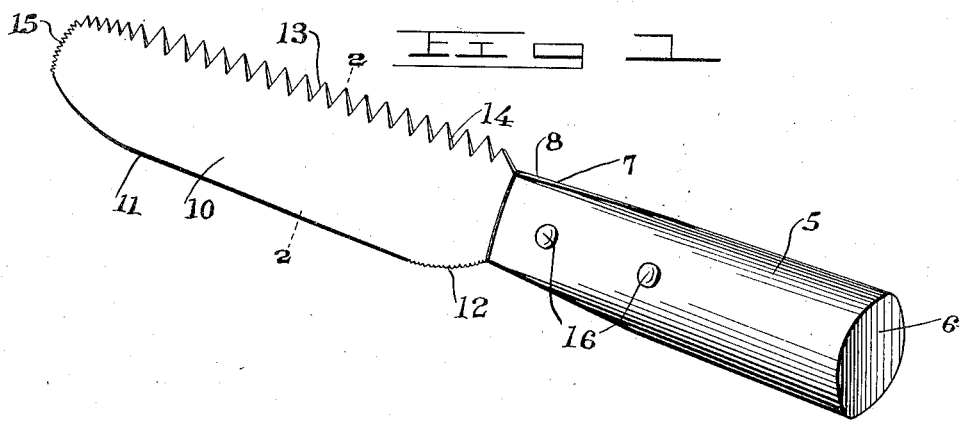
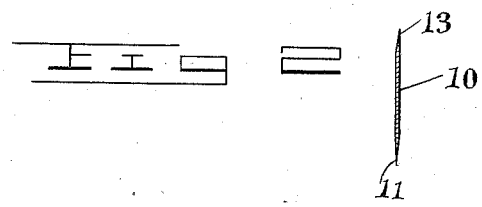
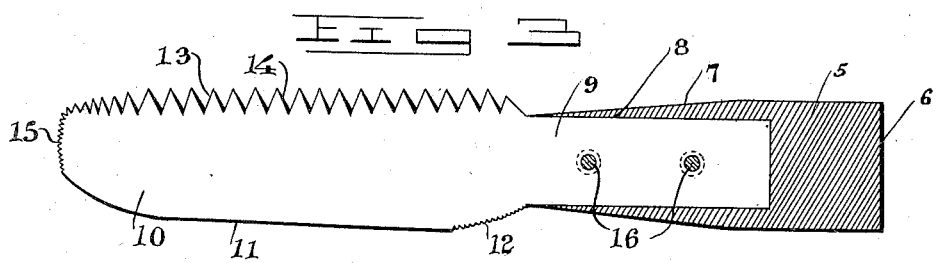
Witnesses
M. F. Garnett
R. B. Cavanagh
Inventor
Joseph E. Buck
By Victor J. Evans
Attorney

UNITED STATES PATENT OFFICE.

JOSEPH E. BUCK, OF SPRING BAY, ONTARIO, CANADA.

KNIFE.

1,040,138.  Specification of Letters Patent.  Patented Oct. 1, 1912.

Application filed June 16, 1911. Serial No. 633,530.

*To all whom it may concern:*

Be it known that I, JOSEPH E. BUCK, a subject of the King of Great Britain, residing at Spring Bay, in the Province of Ontario and Dominion of Canada, have invented new and useful Improvements in Knives, of which the following is a specification.

The present invention relates to certain novel and useful improvements in knives, and has particular application to a knife designed especially for cleaning and cutting fish.

In carrying out my invention, it is my purpose to provide a knife embodying the desired features of simplicty and strength, coupled with convenience and efficiency in operation, so that the fish may be quickly and readily cut and cleaned by means of this knife.

Still a further object of my invention is to provide an improved fish knife having a cutting edge, and a serrated or toothed edge for scraping or removing the scales from the body of the fish, said blade having relatively fine teeth at the end thereof for scraping or removing the insides of the fish.

I also provide the back with means whereby a secure purchase or hold may be obtained upon the knife in tearing out the fins and other parts of the fish.

With the above-recited objects, and others of a similar nature in view, the invention consists in the construction, combination and arrangement of parts, set forth in and falling within the scope of the appended claim.

In the accompanying drawings:—Figure 1 is a perspective view of a fish knife embodying my invention. Fig. 2 is a sectional view, taken through the blade on the line 2—2 of Fig. 1. Fig. 3 is a longitudinal sectional view taken through the handle, showing the blade and manner of securing the same therein.

Referring now to the accompanying drawing in detail, the numeral 5 indicates the handle of the knife, which is formed of wood, bone or other suitable material, the butt 6 of said handle being approximately circular in cross section, said handle being tapered or inclined at the sides as at 7, and such tapered portion is split longitudinally as at 8 to form a groove for the reception of the flat shank 9 of the knife blade, said shank being outwardly tapered to conform to the cross dimensions of the handle.

The blade of the knife is indicated by the numeral 10 and is preferably in the shape shown in the drawings, said blade being formed of suitable material such as steel. Said blade is provided with a curved, keen cutting edge 11, for cutting the fish, said edge adjacent to the handle being notched, roughened or serrated, as at 12 to enable the operator to obtain a firm hold upon the knife in removing the fins and other parts of the fish. The opposite longitudinal edge or the back of the knife is provided with a series of relatively long sharp teeth 13, beveled on one side as at 14, said toothed back being adapted to be used in scraping the scales from the fish. The free end of the blade is substantially straight and is provided with teeth or serrations 15, which are finer than those at the back of the knife, these fine end teeth being used in scraping the insides of the fish.

It will be noted that I have provided an exceedingly simple yet efficient form of fish knife, wherein in one blade is contained the necessary scraping and cutting edges for performing the different steps in the operation of cutting and cleaning the fish. Furthermore, the handle of my improved knife, which is connected to the shank of the blades by rivets 16, is so shaped as to fit snugly and conveniently in the hand, whereby the knife may be easily manipulated. Furthermore, by roughening the knife adjacent to the handle, I am enabled to obtain a secure hold upon the knife in using the same upon fish which are hard to scale such as perch, bass and the like.

I claim:—

A knife comprising a handle slotted to receive the shank of a knife blade, and a knife blade having a longitudinal cutting edge provided adjacent to the shank and handle with serrations to form a gripping surface, said blade having the longitudinal edge opposite the cutting edge provided with a series of teeth, the free end of said blade being straight and provided with a series of relatively fine scraping teeth.

In testimony whereof I affix my signature in presence of two witnesses.

JOSEPH E. BUCK.

Witnesses:
  JOHN LOUGHEED,
  GEORGE C. REED.